CORROSION PROOF SHIELDING TAPE FOR SHIELDING TELEPHONE CABLES
Filed Nov. 1, 1963
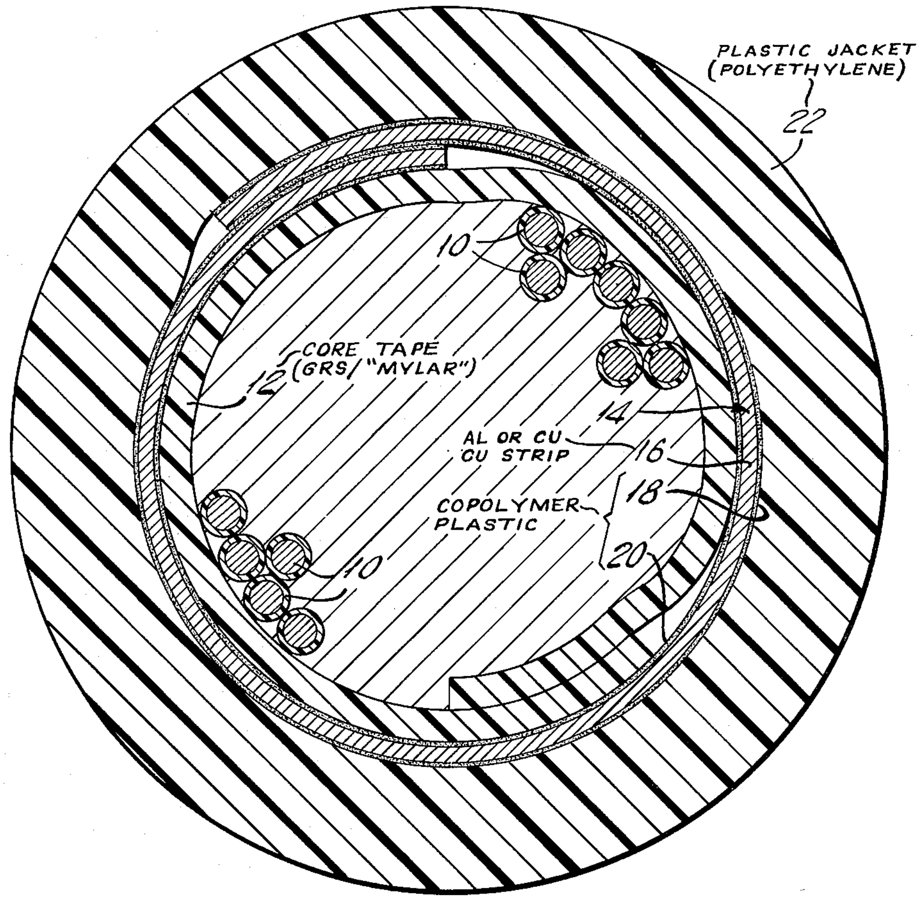
INVENTOR.
LUDWIK JACHIMOWICZ
BY Emery, Whittemore, Sandoe & Graham
ATTORNEYS 3,233,036
Patented Feb. 1, 1966

3,233,036
CORROSION PROOF SHIELDING TAPE FOR SHIELDING TELEPHONE CABLES

Ludwik Jachimowicz, Elizabeth, N.J., assignor to General Cable Corporation, New York, N.Y., a corporation of New Jersey Filed Nov. 1, 1963, Ser. No. 320,777
14 Claims. (Cl. 174—107)

This invention relates to an improved shield for telephone cable, to an improved telephone cable construction utilizing such shields and to the method for making such cables.

In telephone cable and the like, it must be anticipated that the protective jacket will be ruptured at some point along the installed line during the life time of the cable, thus exposing the interior to the corrosive environment of penetrating moisture. Since the shield is relatively thin, this corrosive attack quicky results in an enlarged area of corrosion damage destroying the integrity of the shielding tape which is designed to encase the core components in a continuous conductive shield.

Underground cables, particularly direct buried cables, are exposed to ground water penetration and thus to more highly corrosive conditions. The corrosion problem is so serious as to lead to consideration of replacement of aluminum shielding tape with more expensive copper tapes. However, it appears that even copper tape will not extend the useful lifetime of such cables sufficiently to provide the desired long life span, such as a 30-year life span dictated by the economies of telephone installation. Other solutions, such as the use of tapes of noble metals and flooding of the cable with protective compounds, have been proposed without acceptance.

It is, therefore, an object of the present invention to provide an improved laminated shield for electric cable.

It is a further object of this invention to provide an improved cable construction utilizing a laminated shield.

It is a further object of this invention to provide an improved method of making cable using a laminated shield to ensure corrosion resistance during installation.

In accordance with these objects, the shield constructed in accordance with the preferred embodiment of this invention consists of a metallic strip such as aluminum or copper. The strip is relatively thin, typical thickness being in the range of 5–10 mils. An inexpensive laminate is applied to both sides of the strip in a flexible protective film which has high electrical resistivity, high resistance to chemicals and moisture, and exceptionally good adhesion to the strip to withstand both manufacturing processes such as corrugating and to prevent delamination in corrosive atmospheres or liquids. The polyethylene films generally satisfy the requirements of resistivity and resistance to chemicals and moisture. However, polyethylene does not adhere to metals with the desired bond since the polyethylene is inert and can develop only a mechanical bond based on a friction-type adhesion. However, a graft copolymer of polyethylene and a monomer with a reactive carboxyl group such as an acrylic acid or an acrylic acid ester as described in U.S. Patents Nos. 2,987,501 and 3,027,346 are satisfactory since the carboxyl component of the copolymers have the property of forming chemical bonds with the metals to provide the desired bonding of the film to the metal.

The resistance of the film laminated to both sides of the strip is sufficiently high when applied in thin film ranging from 1–3 mils thick so as to prevent direct attack on the metal surface when exposed to corrosive environments anticipated in the installation of telephone cable in varied locations. If the film is damaged at any point, the metal will be exposed to corrosive attack. However, the rate of degradation of the strip is very much slower than plain strip since the corrosive action enlarging the area of the metal destroyed must proceed along the length of the strip between the protective surface laminations. To so define the path of corrosion, the film must adhere to the strip without delamination under the exposure to corrosive conditions and the mechanical forces of the corrosion products. The shield of this invention will thus greatly increase the useful service life of the shield before the corrosion destruction is sufficiently high so that the shield will not perform its desired function.

A cable constructed in accordance with this invention will comprise, in a preferred embodiment, a plurality of conductors assembled into a cable core. A core tape, such as a GR–S/Mylar laminated tape, is applied over the core in a longitudinal wrap. The laminated shield is applied over the core tape as, for example, in a longitudinal wrap of corrugated tape. The shield may, for example, comprise an 8 mil thick aluminum strip to each side of which is bonded a 2 mil thick film of a copolymer of polyethylene and monomers with reactive carboxyl groups. A jacket, such as a 60–70 mil polyethylene jacket, is extruded over the tape to complete the telephone cable.

During manufacture of this cable, it is desirable to prevent adherence between the outer film of the shield and the jacket extruded thereover which is accomplished in accordance with the method of making this cable by applying a lubricant to the laminated shield and by regulating the extrusion temperature and speed of extrusion of the jacket to prevent adhesion therebetween. For example, in accordance with the preferred method of manufacture, vacuum extrusion is preferably avoided and the shield is oiled prior to entering the extrusion nozzles. The jacket is extruded in a temperature range between 400 and 450° F. In this manner, fusion between the outer plastic film of the shield and the jacket is prevented and only moderate and spotty adhesion is obtained. A complete fusion between the jacket and the outer plastic laminate will increase the difficulty of stripping the cable for splicing and would have the undesirable effect of, at times, exceeding the bonding force of the outer shield laminate to the metallic shield so that during bending of the cable or stripping of the jacket at cable ends, delamination of the outer film of the shield would result, exposing the strip to corrosive attack.

Having briefly described this invention, it will be described in greater detail along with other objects and advantages in the following portions of the specification, which may best be understood by reference to the accompanying figure which is a cross sectional view of a cable constructed in accordance with the present invention.

In the figure, there is shown a telephone cable comprising a plurality of individually insulated conductors 10 assembled into a cable core about which is applied a core tape 12 of conventional construction such as a GR–S/Mylar core tape, 16 mils thick, applied over the core in a longitudinal wrap. A shield 14 is applied over the core tape.

The shield is a laminate consisting, for example, of a metallic strip 16 such as an aluminum strip 8 mils in thickness or a copper strip 5 mils in thickness, to the surfaces of which are bonded plastic protective films 18 and 20. The protective film should be made of material having high electrical resistivity in the order of $10^{15}$–$10^{18}$ ohm-cm. The film in thin layers of 1–3 mils should be highly resistant to chemicals and moisture. The lamination to the strip should have a bond strength sufficiently high so that the laminate can be corrugated without delamination in, for example, corrugations of 10 corrugations per inch, each of which is impressed to a depth of 50 mils, and further without delamination in aqueous solutions of salts, alkalies or acids.

The unmodified polyethylenes do not satisfy the bond strength requirements. The polyethylenes form only a mechanical bond applied, for example, by hot extrusion and a pressure roller, which bond cannot resist delamination in aqueous solutions of salts, alkalies or acids as encountered in ground water. Intermediate adhesives applied between strip and film are similarly unsatisfactory.

However, a laminating film made from a graft copolymer of polyethylene and monomers with reactive carboxyl groups such as acrylic acid or acrylic acid esters as described in U.S. Patents Nos. 2,987,501 and 3,027,346 are satisfactory for the film laminate since they will form both a mechanical and a chemical bond with the metal. Typical commercially available materials are obtainable from Dow Chemical Company, Midland, Michigan, under the designation Copolymer Resin QX–3623 and QX–4262.6.

With the protective film applied to both sides of the shield, a vast improvement in effective lifetime of the shield under corrosive conditions can be obtained. Normally, the bare metallic shields are exposed to attack along the surface thereof and the corrosive destruction proceeds along the thickness thereof. Since thin strips are used, destruction is rapid. However, the shield of this invention protects the surface from the corrosive environment. Even if the film is subject to a localized rupture, the remainder of the surface is protected and the corrosion path is restricted to migration between the surface films, e.g. along the length of the strip. Thus, for example, if the corrosive conditions would destroy an 8 mil tape in two years, then the same condition will also attack the edges of the laminated shield or will attack the shield exposed by a scratch or a pinhole in the lamination. However, in the case of the present shield construction, in the same two years, the damage will widen only by the 8 mil penetration of corrosion. Thus, for example, with 3 inch wide tape, the corrosion will remove 16 mils from the edges or about ½% of the original tape width. Similarly, with a hole or scratch, the mechanically inflicted damage will widen in the same two years by the 8 mils on both sides of the scratch or again by about ½% of the original width of the metal. This small amount of damage will not destroy the function of the shield and a vastly improved lifetime can be anticipated for such cable.

In order that the shield integrity be maintained when the protective jacket such as a 60–70 mil thick polyethylene jacket 22 is extruded thereover, it is necessary to ensure that the jacket does not adhere strongly or fuse to the outer protective film 18 of the shield. Slight adhesion is permissible but firm adhesion or welding must be prevented. If the outer laminate 18 were fused to the jacket, it would be impractical to strip the jacket to get access to the cable shield in order to make ground connections. The shield would be stripped with the jacket and cable splicing would be difficult. Also, since the laminate 18 must remain bonded to the metal tape for protection against corrosion, fusing of the laminate 18 to the jacket might exceed the bond strength between the laminate and the strip which would peel the laminate 18 from the strip when the cable is bent or the jacket is removed thereby exposing bare metal to corrosion. Therefore, in extruding the jacket on the shield, the shield should be lubricated with a lubricant compatible with the polyethylene jacket. This lubricant may conveniently be applied before corrugation and applying the strip to the cable. Additionally, the temperature of the jacketing compound during extrusion should be kept within the range of 400–450° F. for high molecular weight polyethylene jackets and for extrusion speeds of 50 feet per minute and up. Such processing is compatible with normal manufacturing processes. However, it is necessary to avoid vacuum extrusion and high temperatures of extrusion compound (e.g. 450° F. and up) to prevent fusing of the jacket to the protective laminate 18.

This invention may be variously modified and embodied within the scope of the subjoined claims.

What is claimed is:

1. A cable shielding tape comprising a metallic strip having a minimum thickness of about 5 mils, a relatively thinner protective film bonded to each side of said strip, said film having a high resistivity, good resistance to chemicals and moisture, and being bonded to the said metallic strip without use of intermediate adhesive layers and with the bond to metal being achieved by the presence of carboxyl groups in the said film to obtain a chemical bond.

2. The shielding tape in accordance with claim 1 in which said film comprises a graft copolymer of polyethylene and a monomer with a reactive carboxyl group.

3. The shielding tape in accordance with claim 2 in which said monomer with a reactive carboxyl group comprises an acrylic acid.

4. The shielding tape according to claim 2 in which said monomer with a reactive carboxyl group is an ester of acrylic acid.

5. The shielding tape according to claim 1 in which said strip comprises aluminum in the range of 5–10 mils thick and in which each of said films is in the range of 1–3 mils thick.

6. The shielding tape according to claim 1 in which said strip comprises copper in the range of 5–10 mils thick and in which each of said films is in the range of 1–3 mils thick.

7. An electric cable comprising a core including insulated conductor means, a laminated shield completely surrounding the circumference of the core and comprising a metal strip and plastic laminate covering the inner and outer surfaces of the strip, each of the plastic laminates being bonded to the strip without use of intermediate adhesive layers and with the bond to the metal being achieved by the presence of carboxyl groups in the said film to obtain a chemical bond that maintains the bond in the presence of a moist corrosive atmosphere that deteriorates the metal of the strip and in the presence of liquid that corrodes the metal of the strip whereby corrosive atmosphere and liquid that reaches the strip through a puncture in the shield progresses only edgewise from the puncture over an exposure area equal to the product of the puncture perimeter times the thickness of the strip, and an outer jacket of insulation over the outside of the shield and having any adherence to the outer laminate of the shield substantially less than the bonding of the laminate to the strip.

8. A cable in accordance with claim 7 in which said plastic laminate comprises a graft copolymer of polyethylene and a monomer with a reactive carboxyl group.

9. A cable in accordance with claim 8 in which said monomer with a reactive carboxyl group is an ester of acrylic acid.

10. A cable in accordance with claim 8 in which said monomer with a reactive carboxyl group includes an acrylic acid ester.

11. A cable in accordance with claim 7 in which said shield comprises a copper strip in the range of 5–10 mils thick and in which said laminates comprise films, each of which is in the range of 1–3 mils thick.

12. A cable in accordance with claim 7 in which said shield comprises an alumnium strip in the range of 5–10 mils thick and in which said laminates comprise films, each of which is in the range of 1–3 mils thick.

13. A cable in accordance with claim 7 in which said shield is provided with a lubricant on at least the outer surface thereof to prevent fusion between said jacket and the outer laminate of said shield.

14. The electric cable described in claim 7 characterized by the shield comprising a metal strip in the range of 5–10 mils thick and having a lap seam extending lengthwise of the cable, the laminates comprising films, each of which is in the range of 1–3 mils thick, and the laminate on the inside of the strip contacting the laminate on the outside of the strip along the longitudinal lap seam and for a substantial angle of the circumferential extent of the core.

References Cited by the Examiner

UNITED STATES PATENTS

| | | | |
|---|---|---|---|
| 2,526,483 | 10/1950 | Ingmanson | 174—120 X |
| 2,987,501 | 6/1961 | Reike et al. | 260—878 X |
| 3,027,346 | 3/1962 | Rugg et al. | 260—878 |
| 3,130,256 | 4/1964 | Mildner | 174—107 X |

FOREIGN PATENTS

| | | |
|---|---|---|
| 510,190 | 7/1939 | Great Britain. |

BERNARD A. GILHEANY, *Primary Examiner.*

DARRELL L. CLAY, *Examiner.*

DONALD A. KETTLESTRINGS, *Asisstant Examiner.*

Notice of Adverse Decision in Interference

In Interference No. 96,081 involving Patent No. 3,233,036, L. Jachimowicz, CORROSION PROOF SHIELDING TAPE FOR SHIELDING TELEPHONE CABLES, final judgment adverse to the patentee was rendered Nov. 18, 1968, as to claims 1, 2, 3, 4, 5 and 6.

[*Official Gazette May 6, 1969.*]